Thos. F. Halley and Jno. F. Livingston.
Lamp Burner.

117412  PATENTED JUL 25 1871

Witnesses:

Inventor:
Thomas F. Halley.
Jno. F. Livingston.
Per
Attorneys.

UNITED STATES PATENT OFFICE.

THOMAS F. HALLEY AND JOHN F. LIVINGSTON, OF WASHINGTON, D. C.

IMPROVEMENT IN LAMP-BURNERS.

Specification forming part of Letters Patent No. 117,412, dated July 25, 1871.

*To all whom it may concern:*

Be it known that we, THOMAS F. HALLEY and JOHN F. LIVINGSTON, of Washington, in the county of Washington and District of Columbia, have invented a new and Improved Lamp-Burner; and we do hereby declare the following to be a full, clear, and exact description of the same, reference being had to the accompanying drawing making a part of this specification, in which—

Figure 1:
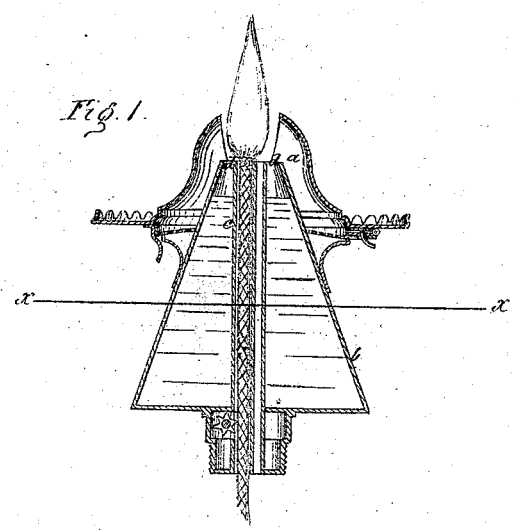
Figure 2:
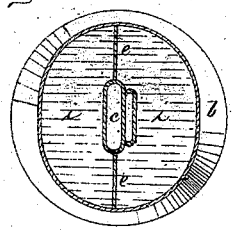

Figure 1 is a sectional elevation, and Fig. 2 is a horizontal section.

Our invention has for its object improvement in the class of lamps or lamp-burners provided with a chamber for containing water, having outlets for escape of the water, so that the flame of the wick may be extinguished when the lamp is upset and explosion prevented.

We construct a water-tank in connection with the burner of a lamp in the form of a truncated cone, and divide it into two compartments, between which there is no communication, and to which there is no filling-orifice or outlet save at the top, or on a level with the top of the wick-tube. By this construction it results that when a lamp to which the burner is attached is upset there must be a complete discharge of its aqueous contents as it rolls over and over, since the central diaphragm or partition between the chambers will, in that case, be in the horizontal plane. Furthermore, since each chamber gradually contracts from its base to its outlet, all the water it contains must concentrate upon the wick in the act of discharging. And this form of chamber furnishes another readily-apparent reason why the discharge will be most copious at the moment of greatest danger, namely, at the moment when the lamp has been just overturned. Whether the chambers be full of water or but partly so, this operation will ensue.

In the drawing, *a* indicates the lamp-burner proper, and *b* a tank or reservoir secured to and inclosing the wick-tube. The tank is in the form of a truncated cone, and is divided into two compartments by the wick-tube and partition *e e* extending laterally and radially from opposite sides thereof. Each compartment has an opening, *d*, at the top sufficiently large to permit a free and sudden discharge of the water out of the tank against the wick whenever the lamp is upset. When this occurs the lamp and burner will, in nearly all cases, lie or roll about upon the floor or table in a horizontal position. Hence, when the tank is full of water there will always be such a volume in the lower half of each compartment above the horizontal plane of the point of discharge as to insure a forcible or copious discharge, and thereby the extinguishing of the wick almost immediately. On the other hand, should the tank chance to contain but a comparatively small quantity of water it will be also discharged, only it will be with diminished force. Thus objections which apply with fatal force to other inventions in this line are overcome, without adding to the cost of the burner as compared with them.

What we claim is, not a burner provided with a tank for holding water, but—

As a new and improved article of manufacture, the burner herein described, provided with the water-tank *b*, which is of conoidal form, and divided by tube *c* and partitions *e e* into two compartments, *i i*, of like size and shape, having discharge and filling-orifices *d d*, as and for the purposes specified.

THOS. F. HALLEY.
JOHN F. LIVINGSTON.

Witnesses:
SOLON C. KEMON,
GEO. E. BROWN.